P. D. ROOT.
LUBRICATING HUB.
APPLICATION FILED AUG. 1, 1912.
1,058,105.
Patented Apr. 8, 1913.
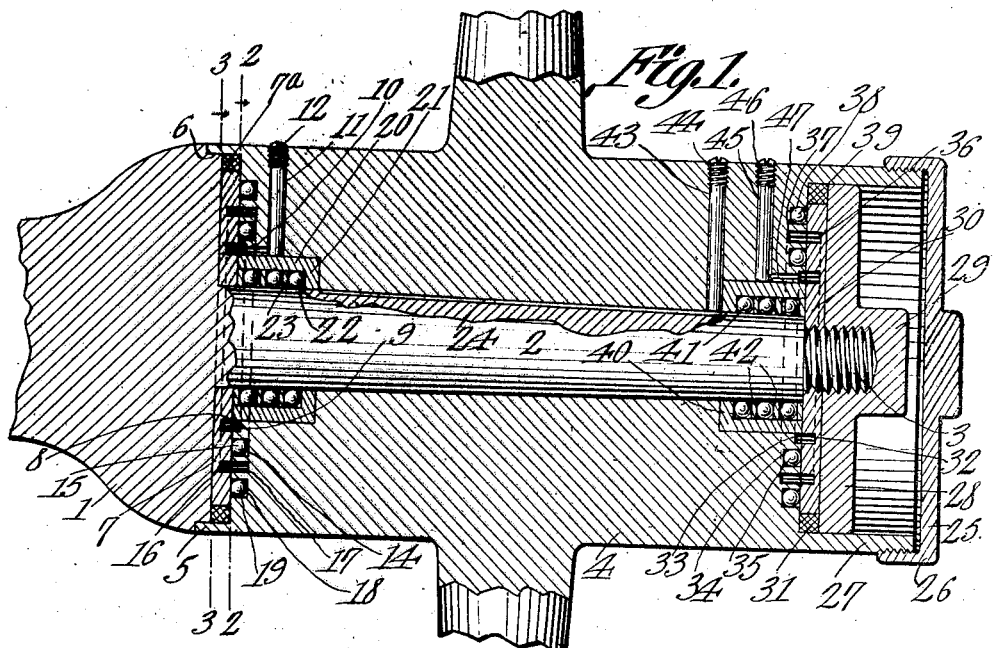
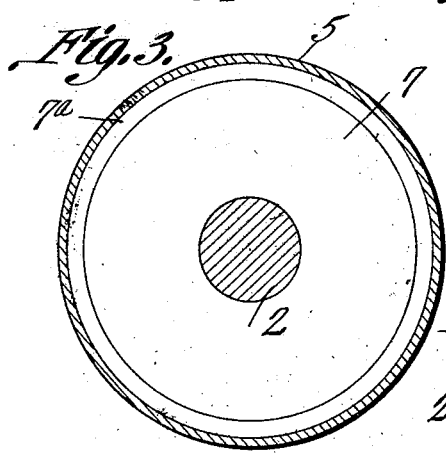
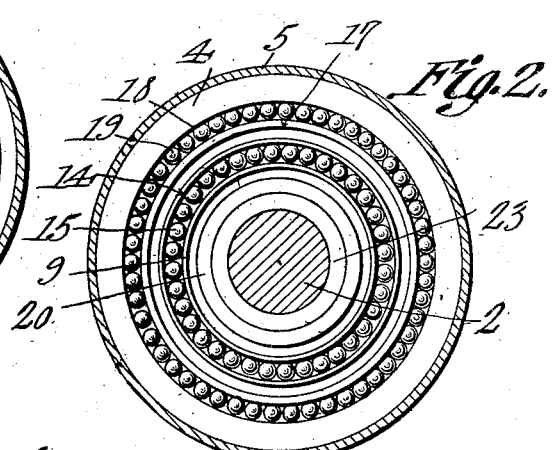
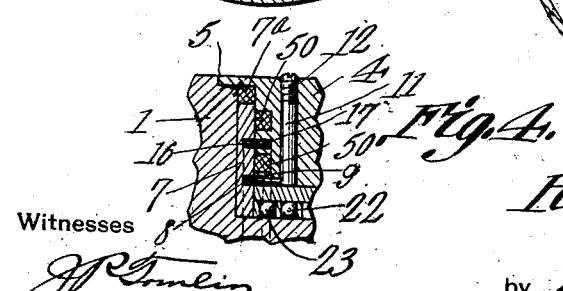
Witnesses
Farley D. Root
Inventor
by C. A. Snow & Co.
Attorneys

UNITED STATES PATENT OFFICE.

PARLEY D. ROOT, OF NORTH SPRINGFIELD, VERMONT.

LUBRICATING-HUB.

1,058,105.  Specification of Letters Patent.  Patented Apr. 8, 1913.

Application filed August 1, 1912. Serial No. 712,754.

*To all whom it may concern:*

Be it known that I, PARLEY D. ROOT, a citizen of the United States, residing at North Springfield, in the county of Windsor and State of Vermont, have invented a new and useful Lubricating-Hub, of which the following is a specification.

One object of the present invention is to provide a hub structure for vehicles, which will operate with minimum friction.

A further object of the invention is to provide novel means for lubricating the hub.

The invention aims further to provide novel means for preventing a lubricant from leaking out of the hub at either end of the hub.

Another object of the invention is to improve, generally, the hub construction of a vehicle wheel, and to provide novel means for assembling the hub with the spindle of the vehicle axle.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings—Figure 1 shows the invention in longitudinal section; Fig. 2 is a transverse section on the line 2—2 of Fig. 1; Fig. 3 is a transverse section on the line 3—3 of Fig. 1; and Fig. 4 is a fragmental longitudinal section showing a slight modification in the invention.

In the drawings, the axle is denoted by the numeral 1, the same having a spindle 2 terminated in a threaded tip 3. The hub is denoted by the numeral 4 and is provided at its inner end with a projecting flange 5 which is received in a recess 6 which circumscribes the axle 1.

Interposed between the end face of the axle 1 and the inner end face of the hub 4 is a washer 7, and at this point it may be stated that any desired number of washers may be employed. If desired, a packing ring 7ᵃ may be interposed between the periphery of the washer 7 and the flange 5. In the inner face of the washer 7, and relatively near to the spindle 2 there is an annular recess 8 located opposite to an annular recess 9 formed in the inner end face of the hub 4. Extended longitudinally of the hub 4 and communicating with the recess 9 is a duct 10 which, in its turn, communicates with a radial oil passage 11 in the hub 4, the oil passage 11 being equipped at its extremity with a closure 12 which may be in the form of a threaded plug. In the inner end face of the hub 4 there is formed a ball race 14, containing balls 15. Beyond the ball race 14 there is formed in the washer 7, an annular recess 16 communicating with another recess 17 formed in the inner end face of the hub 4. Located beyond the recesses 16 and 17, and formed in the inner end face of the hub 4 is a ball race 18, containing balls 19. Surrounding the inner end of the spindle 2 and received within a recess in the hub 4 is a metallic casing 20, having, at its outer end, a flange 21 which projects toward the spindle 2. Located within the casing 20 are a plurality of series of balls 22, each series being spaced apart from the next series by washers 23. Any number of series of balls may be placed within the casing 20. The balls 15 and 19 serve to take the end thrust of the hub, the hub being supported for rotation by the balls 22. At this point it may be stated that, when desired, the balls may be replaced by washers, and in Fig. 4, washers 50 are shown as placed in the ball races 14 and 18. The spindle 2 is equipped with the usual, superficial oil-duct 24.

The invention further includes a cap 25 having a flange which is threaded as indicated at 26 upon a flange 27 formed at the outer end of the hub 4. Located within the flange 27 is a closure plate 28 having a boss 29 into which the tip 3 of the spindle 2 is threaded. Abutting against the closure plate 28 is a washer 30. Any number of washers 30 may be provided. A packing 31 is interposed between the periphery of the washer 30 and the flange 27. In the inner face of the washer 30 there is formed an annular recess 32 communicating with a recess 33 formed in the outer end face of the hub 4. In the outer end face of the hub 4 is formed a ball race 34, containing balls 35. Located outwardly of the ball race 34 and formed in the washer 30, is an annular recess 36 communicating with the recess 37 in the outer end face of the hub 4. Located outwardly of the communicating recesses 36 and 37, and formed in the outer end face of the hub 4 is a ball race 38, containing balls 39. As will be understood readily, the balls 35 and 39, bearing against the washer 30, serve to take up the end thrust of the hub against the closure plate 28. Surrounding the spindle 2 is a casing 40, of the sort hereinbefore described, the casing 40 containing balls 41, which are spaced apart by washers 42. The hub 4 is equipped with a radial oil passage 43 opening upon the spindle 2 adjacent the inner end of the casing 40. The oil passage 43 may be equipped with a threaded closure plug 44. Another oil passage 45, provided with a threaded closure plug 46, opens upon the periphery of the casing 40, there being a duct 47 leading from the passage 45 into the communicating recesses 32 and 33.

In practical operation, the hub 4 is lubricated through the oil passage 43 and through the superficial duct 24 in the spindle 2, the duct 24 serving to distribute, within the casings 40 and 20, so much oil as may be desired, although, in practice, little, if any, lubrication is necessary within the casings 20 and 40. In order to lubricate the hub 4 to resist an end thrust, the oil may be introduced into the passage 11, the same passing through the duct 10 into communicating recesses 8 and 9. In a similar manner, oil may be introduced into the passage 45, the oil passing through the duct 47 into the communicating recesses 32 and 33. Any superfluous oil accumulating at the inner end of the hub will be caught by the communicating recesses 16 and 17, and the same operation takes place at the outer end of the hub, due to the presence of the communicating recesses 36 and 37. There will, therefore, be no dropping of oil from the hub 4, at either end thereof.

The device is so constituted that it may be taken down and be assembled at a minimum expense of labor, and there are no parts subject to extreme wear, or likely to get out of order. Owing to the fact that the device includes, at its outer end, the closure plate 28 and the cap 25, the entrance of dust into the hub, at the outer end thereof, will be prevented, and the flange 5 which is formed at the inner end of the hub likewise serves to prevent an entrance of dust.

Having thus described the invention, what is claimed is:—

1. In a device of the class described, an axle having a spindle; a hub journaled for rotation on the spindle; casings in the ends of the hub; a washer interposed between one end of the hub and one casing; a washer located at the outer end of the other casing; a closure upon the outer end of the spindle, engaging the last specific washer; there being oil passages formed radially in the hub, and opening against the casings, the washers and the adjacent faces of the hub being formed with communicating recesses, there being lateral ducts connecting the oil passages with the recesses and opening laterally against the casings.

2. In a device of the class described, an axle having a spindle; a hub journaled on the spindle; a closure carried by the outer end of the spindle; washers interposed between the closure and the outer end of the hub, and between the inner end of the hub and the axle, the washers and the hub being provided with communicating recesses, there being transverse oil passages in the hub, communicating with the recesses, the washers and the hub being provided with communicating recesses, independent of the first specified recesses, and located beyond the said recesses, to intercept the passage of oil when the oil moves centrifugally toward the periphery of the hub.

3. In a device of the class described, a spindle; a hub journaled on the spindle; a member abutting against one end of the hub, said member and the hub being provided with communicating annular recesses, there being a transverse oil passage in its hub, communicating with the recesses, said member and hub being provided with other communicating recesses independent of the first specified recesses, and located beyond the first specified recesses, to intercept the passage of oil when the oil moves centrifugally toward the periphery of the hub.

In testimony that I claim the foregoing as my own, I have hereto affixed my signature in the presence of two witnesses.

PARLEY D. ROOT.

Witnesses:
 FRED G. FIELD,
 BERTHA I. FIELD.